July 21, 1959
C. W. EISELE
2,895,225
DEPTH AND DIAMETER GAGE
Filed Oct. 9, 1957
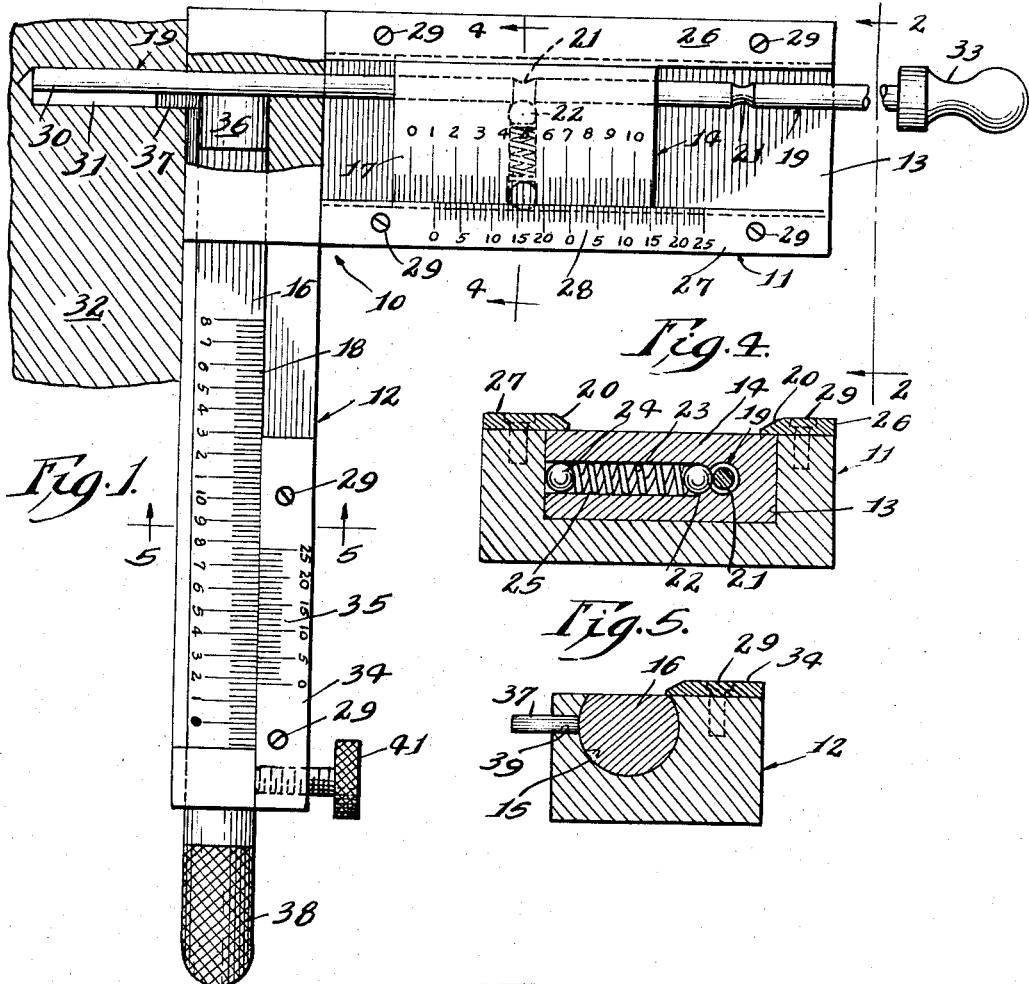
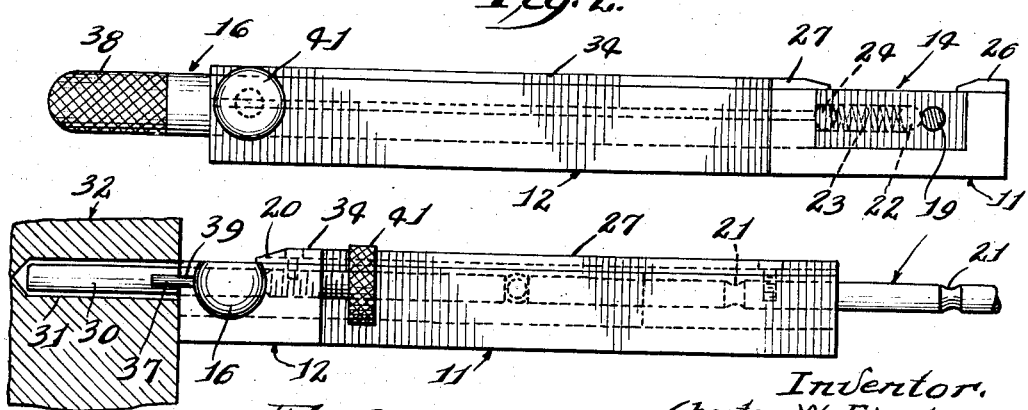
Inventor.
Chester W. Eisele.
By Wilson & Geppert
Attorneys.

United States Patent Office 2,895,225
Patented July 21, 1959

2,895,225
DEPTH AND DIAMETER GAGE
Chester W. Eisele, Homewood, Ill.
Application October 9, 1957, Serial No. 689,107
5 Claims. (Cl. 33—174)

The present invention relates to measuring instruments and more particularly to a novel gage assembly capable of quick and accurate determination of the depth and/or diameter of a bore or hole.

Among the objects of the present invention is the provision in a gage assembly of a novel depth measuring device including in combination a slide and a plunger rod capable of penetration and accurate measurement of the depth of a bore or opening in a work piece or machine element, said plunger rod being divided into one inch increments and projected through said slide, and means in said slide for tensionally gripping and retaining said plunger rod at any of said divisions to facilitate determination of the depth penetrated.

A further object of the present invention is the provision of a gage assembly or measuring device having a novel means for and manner of quickly and accurately measuring and determining the diameter of a bore or opening such as formed in a work piece or machine element.

Another important object of the present invention is the provision of a novel depth and diameter gage arranged in the form of a right angle with one leg having means for penetrating and quickly and effectively measuring the depth of a bore or opening in a work piece or machine element and the other leg having means for quickly and effectively measuring the diameter of said bore or opening.

The present invention further comprehends the provision of a novel combined depth and diameter gage whereby the operator may quickly and accurately determine the depth of a bore or opening and in the same operation quickly and accurately determine the diameter of such bore. Furthermore, the present instrument is so constructed and designed that it forms a square for the squaring of right angles, and is also capable of functioning as a projection gage.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a plan view of the novel depth and diameter gage but with a portion of the housing broken away and the work piece sectioned to disclose the ends of the plungers determining the depth and/or diameter of the bore or opening in the work piece.

Fig. 2 is a view in side elevation of the assembly taken on approximately the line 2—2 of Fig. 1 and viewed in the direction of the arrows.

Fig. 3 is a view in end elevation of the assembly taken from the lower end of Fig. 1.

Fig. 4 is an enlarged view in vertical cross section taken on approximately the line 4—4 of Fig. 1 and viewed in the direction of the arrows.

Fig. 5 is an enlarged view in horizontal cross section taken on the line 5—5 of Fig. 1 and viewed in the direction of the arrows.

Referring more particularly to the disclosure in the drawing and to the novel illustrative embodiment therein shown, the present invention comprises a combination depth and diameter gage including a housing or support 10 formed of substantially rectangular sections 11 and 12 joined together to form a square, the section 11 provided with a longitudinal channel 13 adapted to conformably but slidably receive a longitudinally movable slide member 14 substantially rectangular in cross section and conformably but slidably received in the channel 13, and the section or barrel 12 provided with a longitudinally extending arcuate channel 15 adapted to conformably but slidably receive a longitudinally extending plunger or slide member 16. The slide 14 and the plunger 16 are provided with graduations or scales 17 and 18, respectively, each divided into suitable fractions of an inch, the designations shown being tenths of an inch.

The slide 14 is adapted to receive a plunger rod 19 for depth measurement having spaced reductions 21 each adapted to receive and be frictionally retained by a spring-pressed ball or detent 22. These reductions 21 are shown as spaced apart a distance of one inch. The ball or detent 22 is forced into and held in frictional engagement by a coil or compression spring 23 seating at one end against the ball 22 and at its other end against a second ball 24 in frictional contact with a wall of the channel 13, the balls 22 and 24 and the spring 23 being housed within a transverse slot 25 in the slide 14 intermediate its length.

Along the opposite edges of the section 11 are provided longitudinally extending top plates 26 and 27 with the tapered or inclined lip 20 of each plate overhanging the channel 13 and the slide 14 to retain the slide in the channel. The plate 27 is provided with a vernier scale 28 which in the disclosed embodiment is designated in one-hundredths of an inch. Both plates are preferably detachably mounted by screws or the like 29.

The end 30 of the plunger rod 19 for measuring or determining the depth of a bore or opening 31 in a work piece 32 is projected into the bore by means of a knob or handle 33 affixed to the outer end of the rod 19. This rod may be of any desired length and divided by the spaced reductions 21 into inch divisions, the number of divisions provided depending upon the ultimate length of the rod desired and the depth to which the rod is capable of being projected into the bore 31. Thus any desired depth of bore may be measured by varying the length of the plunger rod 19. When the rod is depressed beyond the first, second or more inch designation or reduction 21, the depth the end 29 of the rod penetrates beyond that designation may be quickly read on the scales 17 and 28.

The housing section or barrel 12 is provided with the offset arcuate channel or slot 15 adapted to receive the plunger or slide 16. A plate 34 having a tapered lip or edge 20 and a vernier scale 35 is attached to the upper face of the section or barrel 12 by screws or other attaching means 29. The plunger or slide 16 has for its purpose the determining of the diameter of the bore or opening 31 and is provided at its inner end with a plug 36 and a projection 37 both attached to and carried by the slide 16. At its outer end the plunger or slide 16 is provided with a knurled knob or handle 38 for manipulating or moving it longitudinally within the barrel 12.

The barrel 12 receiving the plunger or slide 16 is provided at one side with a longitudinal slot 39 for slidably receiving the projection 37, and at its other side with a threaded opening to receive the threaded shank of a set or locking screw 41 for retaining the plunger 16 at the desired setting.

By the present invention an extremely fast and accurate check of holes and counterbores for both depth and diameter may be made simultaneously. The depth of projection of the end 30 of the plunger rod 19 can be changed by one inch increments or divisions rapidly, all that is required is for the operator to push the rod in or out to the desired increment in the slide 14 whereupon the rod is automatically but detachably locked in such adjusted position by the spring-actuated ball or detent 22. The depth reading is taken by pushing the end 30 of the plunger rod 19 to the bottom edge of the hole 31 as shown in Fig. 1, and then reading the vernier. The depth may vary from minimum to a maximum, the latter depending upon the effective length of the penetrating end 30 of the plunger rod 19 and the number of divisions 21 on this rod.

The slide or plunger 16 in the arcuate chanel 15 of the barrel 12 determines the diameter of the bore or hole to be measured. This may be accomplished simultaneously with the determination of the depth as all that is required is for the plunger rod 19 to touch one side of the bore or hole 31 as in Fig. 1, and then upon withdrawing the plunger or slide 16 until its projection 37 abuts the opposite side of the hole a reading of the vernier scale will give the diameter of the hole.

It will be further evident that the present novel gage assembly is effective as a square for squaring right angles and is also effective as a projection gage.

Having thus disclosed the invention, I claim:

1. In combination, a depth and diameter gage assembly comprising a pair of channelled sections arranged to form a right angle square, a slide in the channel of one of said sections and a plunger rod projecting through and movable with said slide longitudinally in the channel of said one section with an end of said plunger rod projecting beyond the outer margin of the other section for penetrating an opening to be checked, said plunger rod having spaced designations and means in said slide for tensionally but detachably retaining said plunger rod at a predetermined and designated spacing to facilitate determining the depth of the opening, and an adjustable plunger longitudinally movable in the channel of the other of said sections and at a right angle to said plunger rod and having a projection extending beyond said outer margin and adjustable relative to the projecting end of said plunger rod whereby the positioning of the projecting end of the plunger rod against one side of the opening and the projection on the plunger against the opposite side of said opening determines the diameter thereof.

2. A combined depth and diameter gage comprising a right angle square with each leg of said square having a longitudinally extending channel, a slide in the channel of one of said legs, a plunger rod carried by and projecting through and longitudinally movable with said slide in its channel with an end of said plunger rod projecting beyond the outer margin of said other leg for insertion of said end of said plunger rod into an opening to check its depth, said slide and its leg provided with means for measuring the depth of said opening, a plunger longitudinally movable in the channel of said other leg at a right angle to said plunger rod and provided with a lateral projection adjustable relative to the projecting end of said plunger rod and insertable into said opening, said plunger and its leg provided with means for measuring the diameter of said opening when said end of the plunger rod is inserted into and engages one side of the opening to be checked and said projection is inserted into and engages the opposite side of said opening.

3. A combined depth and diameter gage comprising a pair of sections angularly connected to provide a square and each section provided with a longitudinal channel, a slide longitudinally movable in the channel of one of said sections and provided with a scale, a plunger rod carried by and longitudinally movable with said slide with an end of said plunger rod projecting beyond the outer margin of the other section, a vernier scale carried by the section with said slide to provide an accurate reading of the depth of penetration of the end of said plunger rod into a bore to be checked, a plunger slidably mounted and longitudinally movable in the channel of the other section at a right angle to said plunger rod and provided with a projection also received in said bore and adjustable relative to the projecting end of the plunger rod, a scale on said plunger and a vernier scale on the section carrying the plunger for measuring the diameter of said bore when the end of the plunger rod is projected into and engages one side of said bore and said projection on the plunger is moved into engagement with the other side of said bore.

4. A combined depth and diameter gage comprising a pair of angularly connected members with each member having a longitudinal channel, a slide longitudinally movable and adjustable in the channel of one of said members and a plunger longitudinally movable and adjustable in the channel of the other member, a plunger rod carried by and longitudinally movable with said slide at a right angle to said plunger with said rod having an end projecting beyond the outer margin of the other member for projecting into and determining the depth of a hole to be measured, and a lateral projection projecting beyond said outer margin and carried by and longitudinally movable with said plunger and adjustable relative to the projecting end of the plunger rod for projecting into and determining the diameter of said hole when the projecting end of the plunger rod is inserted into and engages one side of said hole and the lateral projection on said plunger engages the other side.

5. A combined depth and diameter gage as set forth in claim 4, in which said plunger rod is provided with measured reductions, and spring-pressed detent means in said slide for tensionally and adjustably connecting said slide and plunger rod at any one of said spaced reductions for determining the depth of penetration of the projecting end of said plunger rod.

References Cited in the file of this patent

UNITED STATES PATENTS

| 2,650,435 | Kidd | Sept. 1, 1953 |

FOREIGN PATENTS

| 205,220 | Sweden | June 14, 1939 |
| 372,153 | Italy | June 17, 1939 |
| 553,324 | England | May 17, 1943 |